Patented June 2, 1953

2,640,834

UNITED STATES PATENT OFFICE 2,640,834

DITHIOCARBAMATES AND DERIVATIVES THEREOF

Lyndon B. Tewksbury, Jr., Potsdam, N. Y., and Sylvia S. Heikkila, Naugatuck, Conn., assignors to United States Rubber Company, New York, N. Y., a corporation of New Jersey No Drawing. Application April 18, 1947,
Serial No. 742,448

1 Claim. (Cl. 260—332.1)

This invention relates to dithiocarbamates and derivatives containing the essential N-substituted thiocarbamyl sulfide group

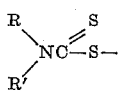

where R is a functionally aliphatic group, and R' is a thiolane nucleus. In particular, it relates to the metal salts of a thiocarbamic acid having the formula

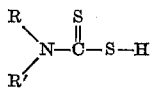

R and R₁ being as defined.

An object of the invention is to provide a new series of chemicals. A further object is to provide chemicals which may be used in the manufacture of rubber goods derived from natural or synthetic rubber, which includes the polybutadienes, polysubstituted butadienes, and modified polybutadienes, such as GRS and GRA. Another object is to provide chemicals which may be used as rubber vulcanization accelerators, or as lubricant oil additives, or as intermediates in the preparation of other chemicals. Other objects will be apparent from the hereinafter description.

The chemicals may be prepared from a secondary amine having the formula

where A is a functionally aliphatic radical, and T is the sulfolanyl group

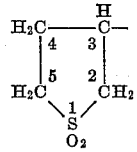

by reacting the amine with carbon disulfide and an alkali, whereby to form the water-soluble alkali-metal dithiocarbamates. Other metal salts, such as those of calcium, barium, iron, lead, etc., may be derived from the alkali-metal dithiocarbamates, e. g., from sodium dithiocarbamate, by replacing the alkali-metal by reaction with a solution of the metal which is desired to replace the sodium.

The secondary amine may be prepared from butadiene sulfone and the appropriate aliphatic primary amine by heating the two together, e. g., 5-24 hours at a mildly elevated temperature such as 50–80° C. Butadiene sulfone

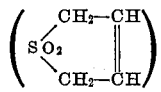

is prepared from reacting sulfur dioxide with butadiene-1,3.

In the case of sodium alkyl sulfolanyl-3 dithiocarbamate, the formula would be

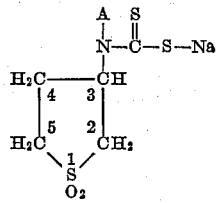

Examples of functionally aliphatic substituents represented by A, are methyl, ethyl, n-propyl, isopropyl, n-butyl, isobutyl, n-amyl, isoamyl, cyclohexyl, benzyl, allyl, methallyl, n-octyl, n-dodecyl, substituted-alkyls, for example beta-methoxy ethyl, beta-chloroethyl, etc.

Typical of the various secondary amino thiolanes which may be reacted with carbon disulfide and a base are:

1,1-dioxo 3-methylamino thiolane
1,1-dioxo 3-ethylamino thiolane
1,1-dioxo 3-n-propylamino thiolane
3-cyclohexylamino 1,1-dioxo thiolane
3-benzylamino 1,1-dioxo thiolane
3-allylamino 1,1-dioxo thiolane
1,1-dioxo 3-methallylamino thiolane
1,1-dioxo 3-isopropylamino thiolane
1,1-dioxo 3-dodecylamino thiolane
1,1-dioxo 3-β-methoxyethylamino thiolane.

In addition to the sodium salts, the corresponding salts of the following are also within the scope of the invention: potassium, ammonium (hypothetical metal) and substituted ammonium, copper, magnesium, zinc, cadmium, mercury, lead, tin, chromium, manganese, iron, cobalt, nickel, selenium, and bismuth. The insoluble salts, particularly the zinc and lead salts are effective as vulcanization accelerators.

The dithiocarbamate salts may be converted to esters by reacting with, broadly, various halides such as:

4-nitrochloro benzene
2,4-dinitrochloro benzene
Triphenyl methyl chloride
Benzal chloride Sym. dichloro-dimethyl ether
2-chlorobenzothiazole
Chloracetone
o-Nitrophenyl sulfur chloride
p-Nitrobenzyl chloride
α-Chloro ethyl acetate
Diphenyl carbamyl chloride
Dichloro acetic acid
Ethyl chloro carbonate
Benzyl thiuronium chloride
Phenyl imino carbon dichloride
Methyl bromide
Ethyl bromide
n-Amyl bromide
Ethylene dichloride
Dodecyl bromide The dithiocarbamates may also be reacted with so-called "positive" chlorine compounds such as:

Monochloramine ($NH_2 \cdot Cl$)
N-chlorcyclohexylamine
N-chlorpiperidine
N-chlor acetamide
N-chlor succinamide
N-chlor di n-butylamine
N-chlor diethylamine
N-chlor morpholine
N-chlor isopropylamine
N-chlor diamylamine to form sulfenamide type compounds by a procedure as illustrated in Examples 7, 9, 11, and 15 below. Example 7 below describes the preparation of S (N'-ethyl N'-sulfolanyl-3 thiocarbamyl) sulfenamide, having the formula

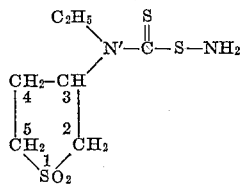

In the name, S indicates that the thiocarbamyl group is joined to the sulfur of the sulfenamide ($SNH_2$) nucleus. To differentiate between the nitrogens, the thiocarbamyl nitrogen is labeled N' as indicated.

The sulfenamides may conform to either the type

I   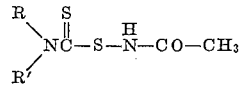

II  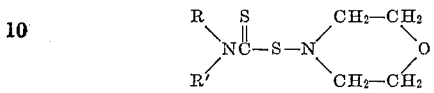

(R'' being the replacement radical of the chlorine compound)

depending on the type of "positive" chlorine compound used. For example, where N-chlorcyclohexylamine is reacted with an alkali-metal salt, the reaction is illustrated as follows:

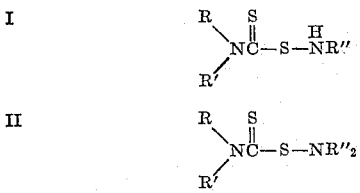

Where N-chlor diethylamine is used, the corresponding end product is of the type

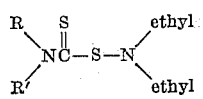

Where N-chlor acetamide is used, the end product is of the type

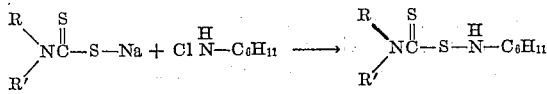

Where N-chlor morpholine is used, the end product is of the type

Of particular value, are the thiuram disulfides formed by oxidation of the dithiocarbamate with iodine, chlorine, sodium hypochlorite, acidified hydrogen peroxide, etc. Exemplary of useful thiuram disulfides are:

Bis (methyl sulfolanyl-3) thiuram disulfide
Bis (ethyl sulfolanyl-3) thiuram disulfide
Bis (n-propyl sulfolanyl-3) thiuram disulfide
Bis (n-butyl sulfolanyl-3) thiuram disulfide
Bis (n-amyl sulfolanyl-3) thiuram disulfide
Bis (n-octyl sulfolanyl-3) thiuram disulfide
Bis (n-dodecyl sulfolanyl-3) thiuram disulfide
Bis (isopropyl sulfolanyl-3) thiuram disulfide
Bis (isobutyl sulfolanyl-3) thiuram disulfide
Bis (isoamyl sulfolanyl-3) thiuram disulfide The following examples are given to illustrate the preparation of the chemicals, the parts being by weight:

*Example 1(a).—1,1-dioxo-3-n-butylamino thiolane*

1,1-dioxothiolane-3 (butadiene sulfone) 59 g., 146 g. n-butylamine and 146 cc. water are heated at 65–70° C. for 13¾ hours in a flask equipped with a reflux condenser. The unreacted amine and most of the water are removed in a good vacuum from a water bath at approximately 40–50° C. The oily residue weighs 97.3 g. The theoretical yield of 1,1-dioxo-3-n-butylamino thiolane is 95.5 g., indicating the presence of a small amount of water.

*Example 1(b).—Sodium n-butyl sulfolanyl-3-dithiocarbamate*

A mixture of 47.7 g. 1,1-dioxo 3-n-butylamino thiolane and 10.0 g. sodium hydroxide in 250 cc. water is treated in an ice bath with stirring with 16.2 g. carbon disulfide. After 3 hours stirring, an orange solution of sodium n-butyl sulfolanyl-3 dithiocarbamate is obtained. By evaporation under reduced pressure, a heavy oil is obtained, which solidified on trituration with acetone. The white crystalline solid softens at 90–100° C. and decomposes at 128° C.

*Example 2.—Potassium n-butyl sulfolanyl-3-dithiocarbamate*

A mixture of 47.7 g. 3-n-butylamino 1,1-dioxothiolane and 16.5 g. potassium hydroxide in 250 cc. water is stirred 4 hours at 10–15° C. with 16.2 g. carbon disulfide and the mixture filtered. The clear filtrate is an aqueous solution of the potassium salt of n-butyl sulfolanyl-3 dithiocarbamic acid. By evaporation under reduced pressure and trituration with alcohol, a crystalline material softening at 71–76° C. and decomposing at 87° C. is obtained.

*Example 3.—Barium n-butyl sulfolanyl-3 dithiocarbamate*

An aqueous solution of sodium n-butyl sulfolanyl-3 dithiocarbamate is mixed with an aqueous solution of barium chloride in stoichiometric amounts. The barium dithiocarbamate precipitates. After washing and drying it melts at 165–170° C. with decomposition.

Example 4.—Ferrous n-butyl sulfolanyl-3 dithiocarbamate

This salt is prepared from ferrous sulfate and sodium n-butyl sulfolanyl-3 dithiocarbamate in water solution. Precipitation occurs immediately. The dark brown salt after drying melts with decomposition beginning around 140° C.

Example 5(a).—1,1-dioxo-3-ethylamino thiolane

Butadiene sulfone (42.5 g.) and 90 cc. of a 70% aqueous solution of ethylamine are heated 5½ hours at 65–70° C. in a thick walled flask. The unreacted ethylamine and water are removed in a vacuum from a water bath at approximately 40–50° C. An oil amounting to 55 g. and consisting of 1,1-dioxo-3-ethylamino thiolane is obtained.

Example 5(b).—Sodium ethyl sulfolanyl-3 dithiocarbamate

Two tenths mol of the above amine is mixed with 33.3 cc. (0.2 mol) of 6 N sodium hydroxide and 70 cc. water, and the mixture is cooled to 10° C. while 9.0 cc. carbon disulfide are added slowly with stirring. After 2 hours, a clear orange brown solution of the sodium ethyl sulfolanyl-3 dithiocarbamate is obtained.

Example 6.—Zinc ethyl sulfolanyl-3 dithiocarbamate

On treatment of a water solution of sodium ethyl sulfolanyl-3 dithiocarbamate with an equivalent amonut of zinc sulfate, a yellow precipitate immediately forms which is filtered, washed, and dried.

Example 7.—S-(N'-ethyl N'-sulfolanyl-3 thiocarbamyl) sulfenamide

A water solution containing 0.2 mol of the sodium salt of the dithiocarbamate of Example 5 is treated at 0–5° C. with a slight excess of monochloramine solution. The product after filtration and washing with water is recrystallized from alcohol. An 80% yield of S-(N'-ethyl-N'-sulfolanyl-3 thiocarbamyl) sulfenamide melting 103–5° C. is obtained.

| Analysis | Theory | Found |
| --- | --- | --- |
| Nitrogen | 11.0 | 10.64 |
| Sulfur | 37.8 | 37.58 |

Example 8(a).—1,1-dioxo 3-allylamino thiolane

Butadiene sulfone (59 g.), allylamine (114 g.) and 114 cc. water are heated in a thick-walled flask 10 hours at 65–70° C. The unreacted amine and water are removed under vacuum from a water bath at 40–50° C. The oily residue consisting of 1,1-dioxo 3-allylamino thiolane amounts to 73.4 g.

Example 8(b).—Sodium allyl sulfolanyl-3 dithiocarbamate

Thirty-five grams of 3-allylamino 1,1-dioxo thiolane are treated in the cold with 8 g. sodium hydroxide in 200 cc. water and 7.6 g. carbon disulfide. After 1½ hours stirring, an orange solution of sodium allyl sulfolanyl-3 dithiocarbamate is obtained.

Example 9.—S-(N'-allyl-N'-sulfolanyl-3 thiocarbamyl) sulfenamide

The dithiocarbamate solution of Example 8 is treated with excess monochloramine as previously described. S-(N'-allyl-N'-sulfolanyl-3 thiocarbamyl) sulfenamide is obtained as a white powder of melting range 80–86° C.

Example 10.—Zinc allyl sulfolanyl-3 dithiocarbamate

The dithiocarbamate solution of Example 8 is mixed with an equivalent amount of zinc sulfate. There immediately precipitates the corresponding insoluble zinc dithiocarbamate.

Example 11.—S-(N'-butyl-N'-sulfolanyl-3-thiocarbamyl) sulfenamide

This material having a melting range of 72–76° C. is prepared from monochloramine and sodium butyl sulfolanyl-3-dithiocarbamate of Example 1.

Example 12.—Sodium methyl sulfolanyl-3 dithiocarbamate

Thirty grams 1,1-dioxo 3-methyl amino thiolane are converted to the dithiocarbamate with 8 g. sodium hydroxide and 10.8 cc. carbon disulfide in 200 cc. water at 10–15° C.

Example 13.—Bis (methyl sulfolanyl-3) thiuram disulfide

The dithiocarbamate solution of Example 12 is diluted to 500 cc. and cooled to 0–5 C. At this temperature it is treated with a solution of 11 g. 30% hydrogen peroxide and 9.8 g. sulfuric acid in 35 cc. water. The product which precipitates during the peroxide addition is filtered, washed with water and dried. After digestion with alcohol, 31.8 g. bis (N-methyl-N-sulfolanyl-3) thiuram disulfide melting 172–175° C. with decomposition are obtained.

Example 14.—Bis (ethyl sulfolanyl-3) thiuram disulfide

The aqueous solution of sodium ethyl sulfolanyl-3 dithiocarbamate (0.2 mol) (Example 5) is diluted to three times its volume (approximately 300 cc.), cooled to below 5° C., and treated with 0.1 mol iodine as an aqueous potassium iodide complex solution. After standing overnight, the white product is filtered, washed with water, and dried. A yield amounting to 73% of bis (ethyl sulfolanyl-3) thiuram disulfide as a white powder melting 162–169° C. is obtained.

Example 15.—S-(N'-methyl-N'-sulfolanyl-3 thiocarbamyl) sulfenamide

A dithiocarbamate solution prepared according to Example 12 is treated with monochloramine. The product after filtration and washing with water melts 144–145° C.

Example 16.—Zinc n-butyl sulfolanyl-3 dithiocarbamate

This zinc salt is obtained as a white powder by treating the sodium salt of the dithiocarbamate (Example 1) with the calculated amount of zinc sulfate.

Example 17.—Ethyl sulfolanyl-3 ammonium salt of ethyl sulfolanyl-3 dithiocarbamic acid To a cold solution of (34.2 g.) 1,1-dioxo 3-ethylamino thiolane in 75 cc. ether, a solution of 6.02 cc. carbon disulfide in 15 cc. of ether is added. After stirring for several hours a viscous oil consisting of ethyl sulfolanyl-3 ammonium ethyl sulfolanyl-3 dithiocarbamate separates.

The following examples are given to illustrate the effectiveness of the chemicals as rubber vulcanization accelerators, the parts being by weight:

*Example 18*

The various chemicals of this invention are incorporated, respectively, in the following master batch:

| Master Batch | Parts |
|---|---|
| Butadiene-styrene rubbery copolymer (GRS) | 100.0 |
| Tar | 5.0 |
| Carbon black | 50.0 |
| Zinc oxide | 5.0 |
| Sulfur | 2.0 |
| | 162.0 |

The following chemicals were added to the master batch as shown in the table below:

Chemical I—S-(N'-ethyl-N'-sulfolanyl-3 thiocarbamyl) sulfenamide
Chemical II—Bis (ethyl sulfolanyl-3) thiuram disulfide
Chemical III—S-(N'-methyl-N'-sulfolanyl-3 thiocarbamyl) sulfenamide
Chemical IV—Zinc n-butyl sulfolanyl-3 dithiocarbamate

| Stock | A | B | C | D |
|---|---|---|---|---|
| Above Master Batch | 162.0 | 162.0 | 162.0 | 162.0 |
| Chemical I | 0.6 | | | |
| Chemical II | | 0.8 | | |
| Chemical III | | | 0.8 | |
| Chemical IV | | | | 0.8 |

The various stocks are cured 30, 45, 60, and 90 minutes at 45 pounds per square inch steam pressure.

| Cure in Minutes at 45 p.s.i. | Elongation, Percent | Tensile Strength (p.s.i.) | | | |
|---|---|---|---|---|---|
| | | Stock A | Stock B | Stock C | Stock D |
| 30 | 300 | 610 | 950 | 310 | 630 |
| | 500 | 1,400 | 1,710 | 690 | 1,420 |
| | Break | 2,120-660 | 2,350-640 | 1,085-686 | 2,050-636 |
| 45 | 300 | 830 | 1,050 | 810 | 780 |
| | 500 | 1,790 | 2,150 | 1,740 | 1,780 |
| | Break | 2,600-655 | 2,320-520 | 2,115-596 | 2,070-563 |
| 60 | 300 | 950 | 1,115 | 960 | 900 |
| | 500 | 1,910 | 2,250 | 2,010 | 1,940 |
| | Break | 2,400-540 | 2,550-526 | 2,520-596 | 2,570-606 |
| 90 | 300 | 990 | 1,200 | 870 | 1,015 |
| | 500 | 2,200 | 2,400 | 1,900 | |
| | Break | 2,550-593 | 2,650-520 | 2,280-576 | 2,015-490 |

The new accelerators are equally effective in natural rubber tread compounds, and in latex compounds or other conventional vulcanizable compounds of natural or synthetic rubbers. The various vulcanizable synthetic rubbers are herein considered equivalent to rubber, examples being the Buna types (polymers essentially derived from butadiene-1,3) such as Buna N (rubbery copolymer of butadiene-1,3 and acrylonitrile) and Buna S (rubbery copolymer of butadiene-1,3 and styrene). In place of sulfur, other conventional vulcanizing agents susceptible to acceleration may be included.

The accelerators may, if desired, be employed with conventional accelerator activators used with other known accelerators. Also, the new accelerators may be used in combination with known accelerators such as diphenyl guanidine, or conventional thiazyl sulfide accelerators, such as mercaptobenzothiazole and dibenzothiazyl sulfide, etc.

The proportion of the accelerators is the same as the proportion used with other conventional accelerators in the vulcanization of the various elastomers.

Other ratios of compounding ingredients other than those given in Example 18, as well as other desired fillers, pigments, softeners, antioxidants, and the like may be employed in the production of various types of rubber compounds, as will be apparent to those skilled in the art of vulcanization of rubber.

Having thus described our invention, what we claim and desire to protect by Letters Patent is:

A sulfenamide of the formula

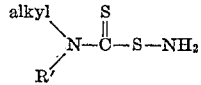

where R' is an unsubstituted sulfolanyl-3 group.

LYNDON B. TEWKSBURY, Jr.
SYLVIA S. HEIKKILA.

References Cited in the file of this patent
UNITED STATES PATENTS

| Number | Name | Date |
|---|---|---|
| 2,219,006 | Delfs | Oct. 22, 1940 |
| 2,285,813 | Hanslick | June 9, 1942 |
| 2,291,798 | Delf | Aug. 4, 1942 |
| 2,325,194 | Olin | July 27, 1943 |
| 2,333,468 | Cooper | Nov. 2, 1943 |
| 2,372,161 | Morris | Mar. 20, 1945 |
| 2,376,338 | Browning | May 22, 1945 |
| 2,381,392 | Smith | Aug. 7, 1945 |
| 2,396,789 | Hunt | Mar. 19, 1946 |
| 2,400,029 | Somerville | May 7, 1946 |
| 2,411,219 | Mathes | Nov. 19, 1946 |
| 2,424,921 | Smith | July 29, 1947 |
| 2,432,255 | Skaptason | Dec. 9, 1947 |
| 2,432,256 | Skaptason | Dec. 9, 1947 |
| 2,435,404 | Morris | Feb. 3, 1948 |
| 2,469,838 | Morris | May 10, 1949 |